B. YOCH.
Traction-Wheel.

No. 196,280.    Patented Oct. 16, 1877.

ATTEST:  
Chas. Hall  
Chas. J. Gooch

INVENTOR:  
Benhard Yoch  
By Knight Bros.  
Attys.

UNITED STATES PATENT OFFICE.

BENHARD YOCH, OF WEST BELLEVILLE, ILLINOIS.

IMPROVEMENT IN TRACTION-WHEELS.

Specification forming part of Letters Patent No. 196,280, dated October 16, 1877; application filed August 24, 1877.

*To all whom it may concern:*

Be it known that I, BENHARD YOCH, of West Belleville, St. Clair county, Illinois, have invented certain new and useful Improvements in Wheels, of which the following is a full, clear, and exact description, reference being had to the accompanying drawings, forming part of this specification.

My improvement relates to that class of wheels which are provided with a track over which the wheels roll, and which is automatically laid down and taken up as the wheel progresses; and my improvement consists in forming said track of separate sections, which have separate attachment to the wheel, and providing mechanism for the presentation of the sections in the proper position for contact with the ground.

Figure 1:
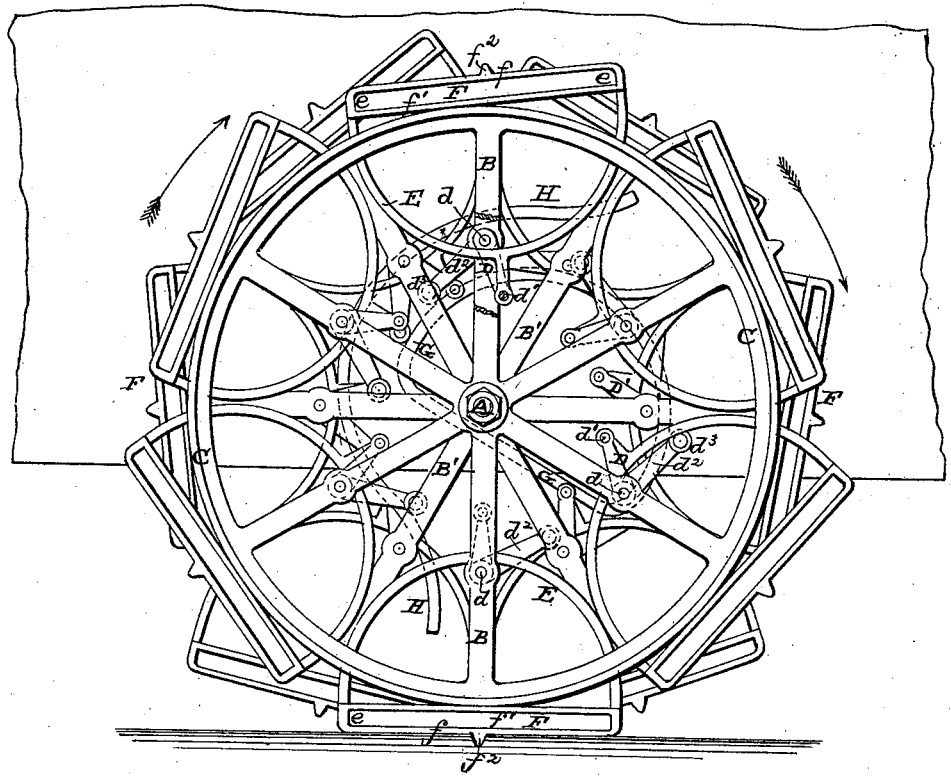
Figure 2:
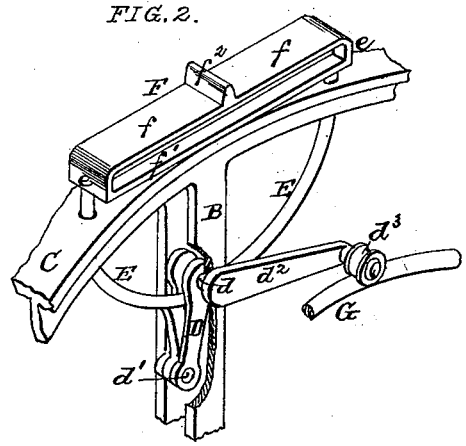

In the drawings, Figure 1 is a side elevation. Fig. 2 is a detail perspective view.

This wheel was invented for use upon traction-engines, but might be used on wheels for many other purposes, where the weight of the load is great and the ground soft.

At A is represented the axle or shaft on which or with which the wheel turns, the same being connected with the body of the engine or vehicle in any suitable manner. B B' are the spokes, and C the rim, of the wheel. The spokes of the wheel are made in two separate sets, each set consisting of two whole circles of spokes. The set B of spokes gives bearing to the pin $d$ of the compound cranks D, while the set B' gives bearing to similar cranks D'. The middle, $d^1$, of each crank is connected to the semicircular guide-bar E, which works through holes in the rim C, and whose ends are attached to the ends $e$ of the rail-sections F, which sections are formed with a broad flat sole, $f$, to rest upon the ground, and a flat cap or crown, $f^1$, upon which the wheel rolls in the same way as upon a fixed rail-track.

The sole $f$ may have one or more transverse ribs, $f^2$, to prevent the section F slipping on the ground.

One of the pins, $d$, of the compound is extended in a crank, $d^2$, whose wrist $d^3$, as the wheel turns around, is brought in contact with the cam-bars G and H, for a purpose now to be described.

It will be understood that the end of the section F that first comes in contact with the earth (as the wheel rolls forward) must be close to the rim of the wheel. To insure this proper position of the rail-section on reaching the earth, the cam G is provided, said cam acting on the crank-pin $d^3$, and moves the compound crank D so as to force the rail-section into the position shown, so that the wheel rolls upon it without any jar. Then, as the wheel rolls forward upon the rail-section, it reaches the other end as the first end commences to rise from the ground, and the section F is held in this latter position by the action of the cam H on the pin $d^3$.

It will be seen that if the wheel always turned forward, as described, (and as indicated by the arrow,) the cam H might be dispensed with, because the cam G would insure the proper presentation of the rail-section to the ground; but when the wheel has movement in an opposite direction, the cam H enforces the proper presentation of the rail-sections; but in the most perfect construction both cams G H are present, so as to prevent the rail-sections from tilting over with a violent movement on passing their highest position, as it will be seen they would be liable to do, owing to their weight.

It will be seen that there are two sets of rail-sections around the wheel, the middle of the sections of one series being opposite to the ends of the sections of the other series, so that the wheel has always a good bearing on at least one of the rail-sections.

The operation is as follows: Supposing the wheel to be turning in the direction shown by the arrow, as the rail-sections pass their point of greatest elevation, their weight may cause them to tilt over, so, as the front ends approach the rim of the wheel, the pin $d^3$ comes in contact with the cam-bar H, and its movement is made gradual. Then, as the movement of the wheel continues, the pin $d^3$ comes in contact with the cam G, and is forced outward until the lower end of the rail-section is in contact with the rim. As the wheel rolls along the section, the front end of the section is brought in contact with the rim, and it is carried up by the wheel. In this position the pin $d^3$ comes in contact with the cam G, when the section is caused by the cam to change position upon the rim of the wheel, as shown.

I claim as my invention—

1. The combination, with the wheel, of the rail-sections F, having the broad flat sole $f$ and flat cap or crown $f^1$, said sections being arranged in two sets around the wheel, and attached thereto, in manner substantially as specified, to insure a traveling-surface for the wheel.

2. The combination, with the wheel and rail-sections F, of the guide-bars E, connected to guide-cranks D, substantially as set forth.

3. The combination of sections F, bar E, compound crank D, and cam G, substantially as set forth.

4. In combination with section F, bar E, crank D, and cam G, the cam H, as and for the purpose set forth.

BENHARD YOCH.

Witnesses:
SAML. KNIGHT,
CHAS. HALL.